UNITED STATES PATENT OFFICE.

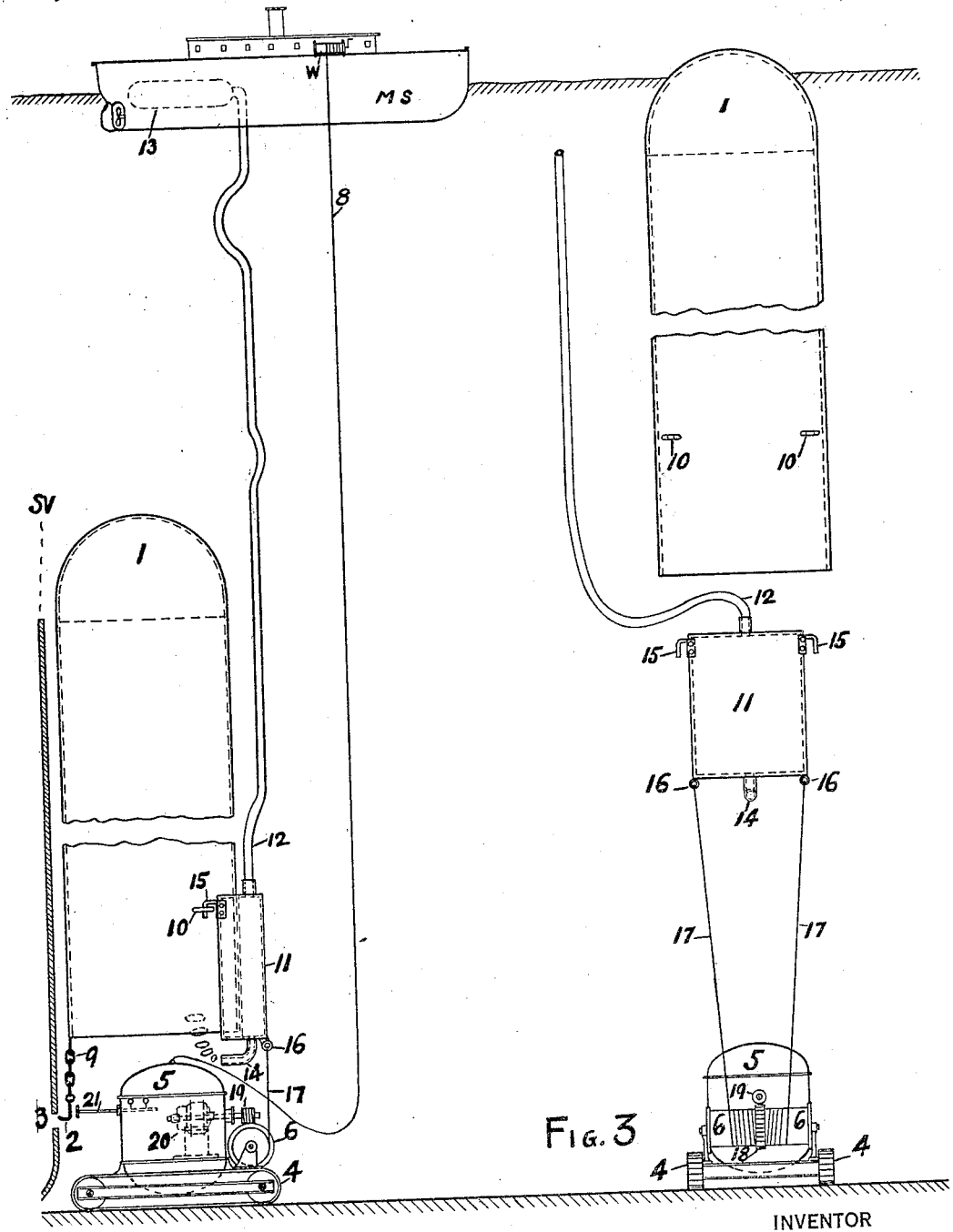

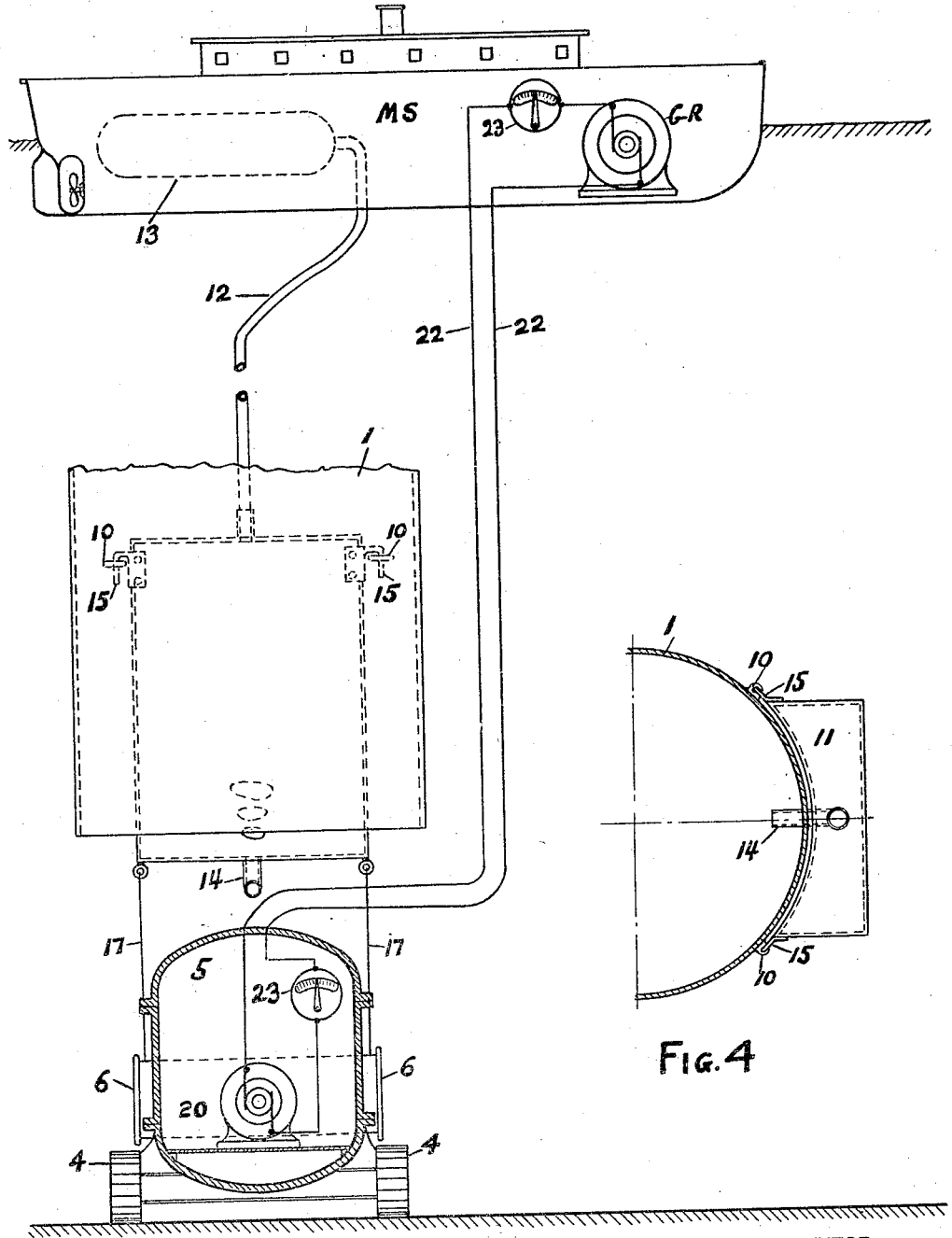

JESSE W. RENO, OF NEW YORK, N. Y.

RAISING SUNKEN VESSELS.

1,364,143. Specification of Letters Patent. Patented Jan. 4, 1921.

Application filed April 2, 1920. Serial No. 370,664.

*To all whom it may concern:*

Be it known that I, JESSE W. RENO, a citizen of the United States, residing in New York, in the county of New York and State of New York, have invented a new and useful Improvement in Raising Sunken Vessels, of which the following is a specification.

This invention relates to the art of raising sunken vessels by means of buoyant air tanks attached to the hull of the vessel and has for its object to provide a method for drawing down the air tanks in the sea to their proper position at the site of the sunken vessel, which is easy and expeditious of application, sure of practical execution, and involves a very high degree of efficiency in the matter of initial first cost and also expense of operations.
In raising sunken ships by buoyant air tanks attached to the hull of the ship, it has been already proposed and planned by me to draw the buoyant air tanks down in the sea to the site of the sunken ship, as is disclosed in my application for a patent, Serial Number 361,092, filed February 25, 1920, entitled, "Devices for raising sunken vessels"; but in my present invention, herein disclosed, I have carried out the idea of the method and means of the invention to an even higher degree of proficiency, if possible; all of which will more fully appear hereinafter in the annexed description, drawings and claims. I might briefly say at the outset that the objects of improvement are, first, to provide means by which an air tank can be drawn down in the sea at the site of the sunken vessel and its speed and direction of descent be under control, which means involve the use of a cable and an air chamber or buoy; which latter serves to return the free end of the cable to the surface of the sea; second, to afford means to maintain a constant volume of air in both the air tank and air buoy during the time they are attached together; and third, to provide a simple method or means to indicate the extent or constancy of the volume of the air in the air tank and air buoy during the time they are attached together. Other objects of my invention will also appear in the description and drawings.

I will now proceed to describe more or less in detail the series of steps or acts or method and the means or devices employed by me indicated above as being involved in my present invention in the art of raising sunken vessels by buoyant force by means of buoyant air tanks attached to the hull of the vessel.

In the accompanying drawings showing the construction of my devices and illustrating their manner of use in my method, Figure 1 is a view of a mother ship, an air tank and air buoy attached together, and an endless belt tractor and working chamber thereon.

Fig. 2 is a view of a mother ship, an air tank and air buoy attached together, an endless belt tractor and working chamber thereon, and an electric generator in the mother ship, and an electric motor in the tractor working chamber, with electric current indicating instruments in the circuit between the generator and motor.

Fig. 3 is a view of an air tank, an air buoy and an endless belt tractor and working chamber thereon and cables connecting the tractor and air buoy.

Fig. 4 is a view in horizontal cross section of an air tank, showing in plan view an air buoy attached to the air tank.

Similar numerals or characters refer to similar parts throughout the several views.

A mother ship, M S, is navigated sufficiently near to or above the site of the sunken vessel, S V, which is to be raised by the buoyant force of air cylinders, 1, bearing hooks, 2, which are to be hooked into holes, 3, formed in the side of the sunken vessel, for instance, by my inventions disclosed in my applications for patents, Serial No. 340,540, filed November 25, 1919 and Serial No. 347,764, filed December 27, 1919, for an apparatus for forming holes in the shell or hull of a sunken vessel adapted to receive hooks attached to air cylinders which by their buoyant force are adapted to raise the sunken vessel. My endless belt tractor, 4, and working chamber, 5, and winding drum, 6, and hole forming tool, carried thereon are then let down in the sea to the bottom thereof by the windlass, W, on the mother ship and the cable, 8, at or near the site or preferably may be at the side of the vessel in the first instance, and thereupon used to form the hole, 3, in the side thereof ready to receive a hook, 2, on the free end of a chain, 9, fast to an air cylinder, 1, which has one end closed and the other end open, and which is towed in the sea to the proper place over the site of the sunken vessel. The cylinder being in an upright position, with its closed end uppermost, contains therein a sufficient volume of air to keep it practically balanced in the sea, as indicated in the Fig. 3. The cylinder is provided near its other end with eyes 10, strongly affixed to its outside. An oblong steel air buoy or chamber, 11, is connected to the free end of an air pipe, 12, the other end of the pipe being connected to an air compressor, 13, on the mother ship. The air buoy, 11, has in its lower end a bent discharge or overflow pipe, 14, leading out of its bottom, or the end opposite to the upper end or entrance of the supply pipe, 12, the exit end of the overflow pipe, 14, being relatively designed to discharge air from the air buoy, 11, in the sea in the proper place to allow the air so discharged to enter the air cylinder, 1, and rise therein to add to the volume of air in the closed end of the cylinder. Secured to the upper part of the air buoy are hooks, 15, adapted to be engaged with the eyes, 10, on the air cylinder, 1, for hooking the cylinder and buoy together, for a purpose which will presently appear. On the lower end of the air buoy, 11, are rings, 16, in which the free ends of cables, 17, are made fast, the other ends of which are wound on a pair of winding drums, 6, mounted on an endless belt tractor, 4. The drums, 6, have a screw gearing comprising a gear ring, 18, geared to a worm, 19, on a shaft driven by an electric motor, 20. The cylinder, 1, standing upright in the sea, with its eyes, 10, receives the hooks, 15, and, upon the air buoy, 11, being drawn down in the sea by the cables 17 being wound up on the drum, 6, the air cylinder, 1, also is simultaneously drawn down in the sea by the hooks, 15, engaged in the eyes, 10, and against the balance or buoyancy of the volume of air in the closed end of the cylinder. When the cylinder, 1, has been drawn down to the position substantially where the elevation of the hooks, 2, is opposite the holes, 3, in the hull of the vessel, the tractor then moves up to the side of the vessel until the points of the hooks, 2, are in position to enter the holes, 3, which have previously been formed in the shell of the ship by my invention for forming holes in the side of a ship, already referred to. Then by using the push-rod, 21, projected from my working chamber, 5, the hook is pushed into the hole, 3, in the side of the ship, thereby securing the air cylinder, 1, fast to the vessel for the purpose of using the buoyancy of the tank to raise the same. After the hook, 2, has been hooked into the hole, 3, the pair of winding drums, 6, are reversed, the cables, 17, unwound or paid out sufficiently to allow the air cylinder, 1, to rise and put tension on the chain, 9, thereby holding the hook in engagement with the vessel, and preventing the cylinder from rising farther.

By continuing to unwind the cables, 17, the air buoy, 11, is allowed to rise and automatically unhook the hooks, 15, from the eyes, 10, whereupon the tractor will be moved or backed out from its position a sufficient distance for the buoy to clear the air cylinder, 1, and upon further unwinding, the cables, 17, to allow the buoy, 11, to rise toward the surface of the sea, ready to be engaged with another air cylinder, 1, to draw it down to the proper position to have its hook engage a hole formed for that purpose in the vessel, as has been described. In this way, I am enabled to haul down the buoyant air cylinders, one after another, in the sea, move them up to the side of the sunken vessel and put the hooks in the holes rapidly and safely, in lines between the mother ship and the tractor and working chamber or sunken vessel, as the case may be, virtually as short and straight as can be afforded by the joining together of the pipe, 12, the air buoy, 11, and the cables, 17. That feature is a notable contribution to the art, since it accomplishes practically full control of the locus of the descending tank, regardless of tidal or other currents, if there be any, a consummation greatly to be desired.

It should be kept in mind that, in order to maintain the balance or proper buoyancy of the air cylinder, 1, as it is hauled down in the sea, it is necessary to supply air from the compressed air supply, 13, on the mother ship, continually to maintain a constant volume or displacement of air in the closed upper end of the air cylinder, 1. In my application for a patent, Serial Number 361,092, filed February 25, 1920, entitled, Devices for raising sunken vessels, I described an invention by which the volume or displacement of air or position of the water level in the air cylinder, 1, is known by an electric indicating device, which is set into action by the rise of the water level in the tank. In my present invention, I indicate the volume or displacement of air or position of the water level in the air cylinder by an apparatus different specifically from the said indicating device, though nevertheless, the present device too is electrical.

I will describe the present apparatus as follows, to wit: within the hoisting cable, 8, for the tractor and working chamber, are located a pair of insulated electric conductors, 22, which are patently shown in Fig. 2. The cable, 8, shown in Fig. 1 has the conductors, 22, within it, but, for convenience in displaying the conductors, 22, the cable 8, is omitted in the Fig. 2, and only the conductors, 22, shown, so far as the hoisting cable, 8, is concerned. The conductors, 22, lead from the electric generator, G R, on the mother ship to the electric motor, 20, in the working chamber, 5, in the circuit of which, I insert electric indicating, signaling or recording instruments, 23, one located on the mother ship and the other in the working chamber. The instruments are in series with each other in the circuit of the conductors, 22, and the current from the generator, G R, passes through them from the said generator to the motor, 20.

I will now describe the operation of maintaining a proper buoyancy of the air cylinder, 1, as it is drawn down in the sea. Sufficient air is forced into the cylinder, 1, to produce an effective buoyancy which will require, we will say, for example, a pull down on the cables, 17, attached to the air buoy, 11, of a force of four thousand (4,000) pounds, which is well within the capacity of the motor, 20, in the working chamber, 5. As the winding drum, 6, continues to draw down the air cylinder, 1, the increased pressure of the water on the air in the upright closed end of the cylinder reduces its volume or displacement, which permits the cylinder to be further pulled down with less and less power exerted by the winding drum, 6, and the motor, 20. If the drawing down operation were continued and no more air were supplied to within the closed end of the cylinder, a point would be quickly reached when the cylinder would have no buoyancy, and it would descend by gravitational force to the bottom of the sea, with accelerated gravity, and without control, and possibly cause a bad accident. As a precaution against an occurrence of that sort, I have provided the instruments 23, to indicate the volume or displacement of air in the closed end of the air cylinder, which discloses the exact power which the motor, 20, is exerting in pulling down the air cylinder, 1; consequently the attendants both on the mother ship, on the surface of the sea, and in the working chamber, 5, on the bottom of the sea, by observing the indicators can know exactly at all times how much power is being consumed in drawing down the air cylinder; and, having predetermined the normal conditions required to draw down an air cylinder, if the motor is exerting less power than it ought to, the air compressor on the mother ship is started up and an increased volume of air is forced into the cylinder, thus restoring the proper buoyancy or balance of the air cylinder.

It is also very important to maintain the proper air buoyancy or balance of the buoy 11, by maintaining a constant volume of air within it, when it is being drawn down in the sea, because if the buoy, 11, should be at the surface of the sea filled with air and then should be drawn down, the air within the buoy would be compressed to such a small volume that the displacement of the buoy would not be sufficient to carry it back to the surface after the air cylinder, 1, had been drawn down as previously described and the air buoy, 11, would be unable to raise the ends of the cables, 17, to the surface of the sea ready for the buoy to be hooked to another air cylinder, 1. In my present invention, the air from the compressor, 13, passing down through the pipe, 12, to the buoy, 11, always maintains the full volume of air within the buoy, 11, and, in fact, the air can only escape from the buoy through the overflow or discharge pipe, 14, in its bottom. The air discharged from the overflow pipe finds its way within the air cylinder, 1, and rises to its upper and closed end, as has already been explained.

What I desire to claim is:—

1. In the art of raising sunken ships by buoyant bodies attached thereto, the combination of a buoyant air cylinder, adapted to be attached to the ship, a hollow buoy, adapted to be detachably fixed to the cylinder, and means to draw the cylinder and buoy attached thereto down in the sea at the site of the sunken vessel.

2. In the art of raising sunken ships by buoyant bodies attached thereto, the combination of a buoyant air cylinder, adapted to be secured to the ship to raise the same by buoyant force, a hollow buoy, adapted to be removably secured to the cylinder, an air pipe connected to the buoy to supply air thereto, and a cable to draw the cylinder and buoy down in the sea at the site of the sunken vessel.

3. In the art of raising sunken vessels by buoyant force, the combination of an air cylinder, closed at one end and open at the other end, a hollow buoy removably fastened thereto, and having air inlet and outlet orifices, a pipe connected to the inlet orifice to supply air under pressure, and a pipe connected to the outlet orifice to discharge air to enter the open end of the cylinder and rise to its closed end, and means to draw the cylinder and buoy down in the sea at the site of the sunken vessel.

4. In the art of raising sunken vessels from off of the bottom of the sea by buoyant bodies attached thereto, the combination of an air cylinder, closed at one end and open at the other end, a hollow buoy detachably secured to the cylinder, and having air inlet and outlet orifices, a supply pipe connected to the inlet orifice to supply air under pressure and an overflow or discharge pipe connected to the outlet orifice to discharge air to enter the open end of the cylinder and rise to the closed end, means to draw the cylinder and buoy down in the sea, comprising a cable, its free end fast to the buoy, and a drum adapted to wind thereon the other end of the cable.

5. In the art of raising sunken vessels from off of the bottom of the sea by buoyant bodies attached thereto, the combination of an air cylinder, closed at one end and open at the other end, a hollow buoy detachably secured to the cylinder, and having air inlet and outlet orifices, a supply pipe connected to the inlet orifice to supply air under pressure and an overflow or discharge pipe connected to the outlet orifice to discharge air to enter the open end of the cylinder and rise to the closed end, means to draw the cylinder and buoy down in the sea, comprising a cable, its free end fast to the buoy, a drum, adapted to wind thereon the other end of the cable, and a tractor, upon which the drum is mounted.

6. In the art of raising sunken vessels by buoyant air cylinders attached to the vessel, the combination of a mother ship, a compressed air tank thereon, a pipe leading therefrom, a hollow buoy, connected to the pipe, an overflow or discharge air pipe connected to the buoy, an air cylinder, closed at one end and open at the other end, adapted to be removably attached to the buoy, a cable, one end fast to the buoy, a drum, the other end of the cable wound on the drum, an endless belt tractor, on which the drum is mounted, and means to operate the drum.

7. In the art of raising sunken vessels by buoyant bodies attached thereto, the combination of a mother ship, an electric generator thereon, a tractor, on the bottom of the sea, an electric motor on the tractor, a conductor circuit between the generator and motor, instruments in the circuit, to indicate the output of current of the generator and intake of current by the motor.

8. In the art of raising sunken vessels by the use of buoyant force, the combination of a mother ship, a compressed air tank thereon, a hollow buoy, a pipe connecting the tank and buoy, an overflow or discharge pipe leading from the buoy, an air cylinder, closed at one end and open at the opposite end, the cylinder and tank being detachably fastened together, and the overflow pipe adapted to discharge air to rise to the closed end of the cylinder, a cable, its free end fast to the buoy, a tractor, on the bottom of the sea, a drum on the tractor, upon which the other end of the cable is adapted to be wound, an electric motor on the tractor to operate the drum, an electric generator on the mother ship, a conductor circuit between the motor and generator, and instruments in the circuit to indicate the amount of power given by the generator and used by the motor to draw the cylinder and buoy down in the sea.

In testimony whereof I have signed my name to this specification.

JESSE W. RENO.